(12) United States Patent
Ito

(10) Patent No.: US 7,167,771 B2
(45) Date of Patent: Jan. 23, 2007

(54) SPECTACLE LENS MANUFACTURING SYSTEM, METHOD OF MANUFACTURING SPECTACLE LENS, PROGRAM AND RECORDING MEDIUM THEREFOR

(75) Inventor: Ayumu Ito, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 190 days.

(21) Appl. No.: 10/938,818

(22) Filed: Sep. 13, 2004

(65) Prior Publication Data

US 2005/0073650 A1    Apr. 7, 2005

(30) Foreign Application Priority Data

Sep. 12, 2003    (JP)    ............... 2003-320998

(51) Int. Cl.
G06F 19/00    (2006.01)
G06F 17/50    (2006.01)
G06F 15/16    (2006.01)
G02C 5/00    (2006.01)
A61B 3/00    (2006.01)

(52) U.S. Cl. .................. 700/182; 700/97; 700/117; 700/186; 351/200; 351/41; 703/1; 709/200

(58) Field of Classification Search ............ 700/56–58, 700/65, 95, 97, 117, 160, 169, 180, 182, 186; 351/41, 200; 703/1; 709/200
See application file for complete search history.

(56) References Cited

U.S. PATENT DOCUMENTS 5,280,570 A    1/1994    Jordan 6,142,628 A    11/2000    Saigo
6,813,536 B1 *    11/2004    Gottschald ................. 700/160

FOREIGN PATENT DOCUMENTS

JP    2810151 B2    7/1998
WO    WO 97/29441 A1    8/1997
WO    WO 02/065199 A1    8/2002

OTHER PUBLICATIONS

Japanese Patent Laid-open Publication No. 03124486, dated May 28, 1991.

* cited by examiner

*Primary Examiner*—Leo Picard
*Assistant Examiner*—Sean Shechtman

(57) ABSTRACT

To provide a spectacle lens manufacturing system and a method of manufacturing a spectacle lens, as well as a program and a recording medium therefor, that can meet various demands for marking and by which customers can confirm the outer appearance or the like of the spectacle lens. In a spectacle lens manufacturing system, after acquiring mark information and lens information with a terminal, these mark information and lens information are output to a calculation server, and a determination unit of the calculation server determines whether or not marking is possible. If the determination unit determines that it is possible to mark, it is judged whether or not a spectacle lens is manufactured based on a simulation image of the spectacle lens displayed on an image display unit of the terminal, and if it is determined to manufacture the spectacle lens, a processing information-generating unit of the calculation server generates processing information for the spectacle lens.

15 Claims, 9 Drawing Sheets

SPECTACLE LENS MANUFACTURING SYSTEM, METHOD OF MANUFACTURING SPECTACLE LENS, PROGRAM AND RECORDING MEDIUM THEREFOR

RELATED DOCUMENTS

This document claims priority from Japanese Patent Application 2003-320998, filed on Sep. 12, 2003, the disclosure of which is incorporated herein by reference, in its entirety.

Technical Field

The present invention relates to a system for manufacturing a spectacle lens and a method for manufacturing a spectacle lens, as well as a program and a recording medium therefor.

The invention can be applied to the manufacture of spectacle lenses in which a mark, for example, a mark representing its product name, manufacturer, and brand name or a mark that is a designed pattern, is engraved in the interior thereof by a laser.

Background Art

Conventionally, spectacle lenses have marks formed in the interior thereof, which represent its product name, manufacturer, brand name, and the like. These marks are formed by irradiating the interior of a spectacle lens made of plastic with a laser beam to modify the interior of the spectacle lens (see, for example, Japanese Patent No. 2810151, pp. 2–3 and FIGS. 1–2.)

In recent years, demands from customers who use spectacle lenses have become more diversified. There is a demand for forming a mark in the interior of a spectacle lens that represents a brand name or the like so that the mark can be viewed by other people, and there is a demand for forming not only the marks indicating merely a product name, a brand name, or the like but also such marks as customer's initials and designed patterns in the interior of a spectacle lens.

Whether or not the marking demanded by a customer is possible needs to be decided according to the shape of the mark, the outer shape, thickness, and dimension of the spectacle lens, or the like. However, since conventional marking methods presuppose that a product name, a manufacturer, a brand name, or the like is marked with very small characters, such decisions cannot be made in a simple manner. For this reason, conventional methods cannot meet various demands for marking.

In addition to this, another problem is that in retail stores, customers cannot confirm the outer appearance or the like of the spectacle lens because it is difficult to keep a large number of samples of spectacle lenses in which marks are formed.

SUMMARY OF THE INVENTION

It is one object of the invention, among other objects which will be appreciated after reading the description below, to provide a spectacle lens manufacturing system and a method of manufacturing a spectacle lens, as well as a program and a recording medium therefor, that can meet various demands for marking and by which customers can confirm the outer appearance or the like of the spectacle lens.

A spectacle lens manufacturing system according to one embodiment of the invention is a spectacle lens manufacturing system for manufacturing a spectacle lens in which a mark is formed. Such a spectacle lens manufacturing system includes a mark information-acquiring unit for acquiring mark information including shape information of the mark to be formed in the interior of the spectacle lens. Such a system also includes a lens information-acquiring unit for acquiring lens information of a spectacle lens including outer shape information and optical property information, a determination unit for determining whether or not marking of the spectacle lens is possible based on the mark information and the lens information, and an image generation unit for generating a simulation image of the spectacle lens in which the mark has been formed based on the mark information determined by the determination unit as being possible to mark and the lens information and for displaying the simulation image on an image display unit. Such a system also includes a permission/denial selection unit for urging selection of permission or denial for manufacturing the spectacle lens displayed on the image display unit, and a processing information-generating unit for generating processing information for the spectacle lens based on the mark information and the lens information when permission for manufacturing is selected in the permission/denial selection unit.

Here, the mark to be formed in the interior of a spectacle lens maybe a mark indicating a product name, a manufacturer, a brand name, or the like. The mark may also be any kind of designed patterns or characters such as the initials of the customer using the spectacle lens.

In addition, the simulation image of the spectacle lens, generated by the image generation unit, may be such an image that it shows the outer appearance of the spectacle lens and a customer can confirm the appearance from a third party, or it may be such an image that the customer can confirm the range of vision when he or she wears the spectacles.

According to the exemplary embodiment of the invention as described above, the spectacle lens manufacturing system has a determination unit that determines whether marking is possible or not based on mark information and lens information of a spectacle lens, and therefore, it is possible to judge whether or not the marking required by a customer or the like is possible. Thus, in the case where, for example, it is judged by the determination unit that the mark does not fit within the interior of the spectacle lens and the marking is impossible, the mark can be reduce din size or the mark can be changed, and thereby, it is possible to meet various demands for marking from customers or the like.

In addition, the above-described exemplary spectacle lens manufacturing system has an image generation unit that forms a simulation image of the spectacle lens and displays the simulation image on an image display unit, and a permission/denial selection unit that urges selection of permission or denial for manufacturing the spectacle lens displayed on the image display unit. Therefore, the customer can check the outer appearance of the spectacle lens and whether the mark does not obstruct the range of vision based on the simulation image, and moreover, based on this, it is possible to judge whether or not the spectacle lens should be manufactured. Thus, it is possible to manufacture spectacle lenses that meet demands from customers.

In the above-identified embodiment of the invention, it is preferable that a terminal (installed in a retail store that sells the spectacle lens) and a server (connected to the terminal via a communication line) are provided, and that the terminal has the mark information-acquiring unit, the lens information-acquiring unit, the image generation unit, and the permission/denial selection unit, and the server has the determination unit and the processing information-generating unit.

The server may be installed either in a factory or similar facility of the manufacturer of the spectacle lens, or in a retail store, or other suitable location.

With the system as described above, because the terminal has the information-acquiring unit, the image generation unit, and the permission/denial selection unit, and because the server incorporates the other configurations, the capacity of the terminal can be reduced.

In the above-identified exemplary embodiment of the invention, it is preferable to provide a storage unit that stores a plurality of kinds of mark information for different marks, and it is preferable that the mark information-acquiring unit acquires mark information by selecting mark information from the mark information stored in the storage unit.

According to such an embodiment, a plurality of kinds of mark information for different marks may be pre-stored in the storage unit, and mark information thus can be selected from the plurality of pieces of mark information stored in the storage unit. Therefore, it is unnecessary to generate mark information when spectacle lenses are manufactured by the described spectacle lens manufacturing system. Thus, it is possible to simplify the manufacture of spectacle lenses.

In addition, such an exemplary spectacle lens manufacturing system may further include a mark information-generating unit that generates mark information of the mark to be marked in the interior of the spectacle lens, and the mark information-acquiring unit may acquire the mark information generated by the mark information-generating unit.

With the embodiment of the invention as described above, since the mark information-generating unit that generates mark information is provided, the photolithographs, logo marks, and the like that the customer brings in can be captured by a scanner or the like, and mark information can be generated based on the captured images. Thereby, it is possible adequately to meet the needs from customers.

Additionally, the manufacturing system according to an embodiment of the invention may be such that it has both a storage unit that stores a plurality of kinds of mark information for different marks and the foregoing mark information-generating unit. In this embodiment, the mark information-acquiring unit is capable of reading out and selecting mark information from the storage unit, and capable of acquiring the mark information generated by the mark information-generating unit.

The embodiment as described above can be realized not only by a spectacle lens manufacturing system but also by a method of manufacturing a spectacle lens. Such a method of manufacturing a spectacle lens can exhibit similar advantageous effects to those with the spectacle lens manufacturing system.

Specifically, a method of manufacturing a spectacle lens according to an embodiment of the invention is a method of manufacturing a spectacle lens in which a mark is formed, the method characterized in that a computer includes a mark information acquiring procedure of acquiring mark information including shape information of the mark, a lens information acquiring procedure of acquiring lens information of a spectacle lens including outer shape information and optical property information, a determination procedure of determining whether or not marking to the spectacle lens is possible based on the mark information acquired in the mark information acquiring procedure and the lens information acquired in the lens information acquiring procedure, an image generation procedure of generating a simulation image of the spectacle lens in which a mark is formed (based on the mark information and the lens information with which marking has been determined to be possible in the determination procedure), and displaying the simulation image on an image display unit. This embodiment also includes a permission/denial selection procedure of urging selection of permission or denial for manufacturing the spectacle lens displayed on the image display unit, and a processing information-generating procedure of generating processing information of the spectacle lens based on the mark information and the lens information when permission is selected in the permission/denial selection procedure.

In this case, it is preferable that in the mark information acquiring procedure, mark information is acquired by selecting mark information from the storage unit that stores a plurality of kinds of mark information for different marks.

Further, the method of manufacturing a spectacle lens according to an embodiment of the invention may further comprise a mark information-generating procedure for generating mark information of a mark to be marked in the interior of a spectacle lens, and in the mark information acquiring procedure, the mark information generated in the mark information-generating procedure may be acquired.

In addition, the method of manufacturing a spectacle lens as described above can also be realized as a program executable by a computer, and moreover, by a computer-readable recording medium in which the program is recorded. In other words, the invention in one embodiment is a computer program product, for enabling a computer system to perform operations implementing a spectacle lens manufacturing method, and it includes a computer readable medium and computer instructions on the computer readable medium. As used herein, the term "computer program product" is meant to include any and every kind of medium useable by computers, including types developed in the future, and to include any and every kind of software instructions that can be put on such a medium.

The invention is taught below by way of various specific exemplary embodiments explained in detail, and illustrated in the enclosed drawing figures.

BRIEF DESCRIPTION OF THE DRAWING FIGURES

The drawing figures depict, in highly simplified schematic form, embodiments reflecting the principles of the invention. Many items and details that will be readily understood by one familiar with this field have been omitted so as to avoid obscuring the invention. In the drawings.

DETAILED DESCRIPTION OF THE PREFERRED EMBODIMENTS

Herein below, preferred embodiments of the invention are described with reference to the drawings. Although the embodiments are described in detail, it will be appreciated that the invention is not limited to just these embodiments, but has a scope that is significantly broader. The appended claims should be consulted to determine the true scope of the invention.

1. Configuration of Spectacle Lens

Figure 1:
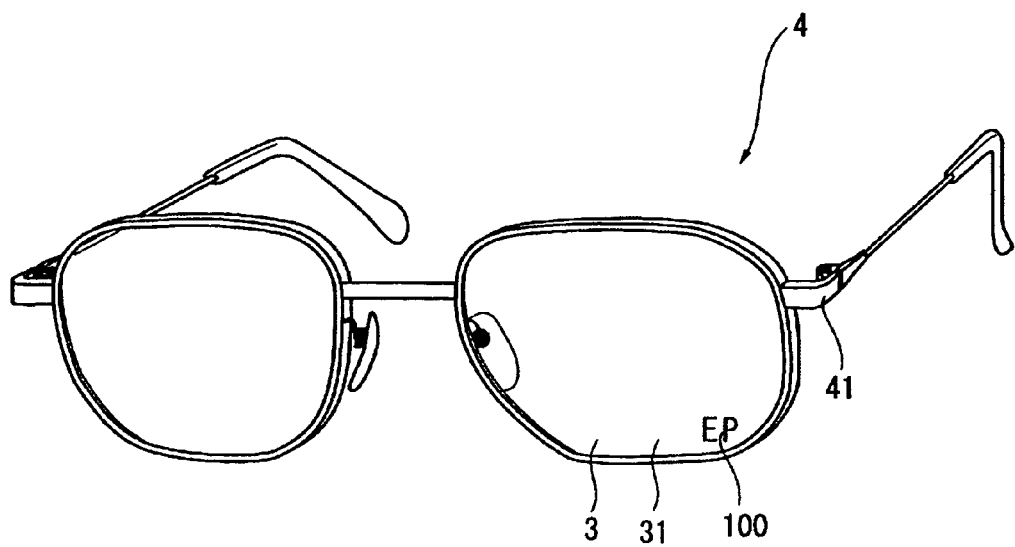
FIG. 1 is a perspective view illustrating spectacles provided with spectacle lenses manufactured by a spectacle lens manufacturing system according to one embodiment of the invention.
Figure 2:
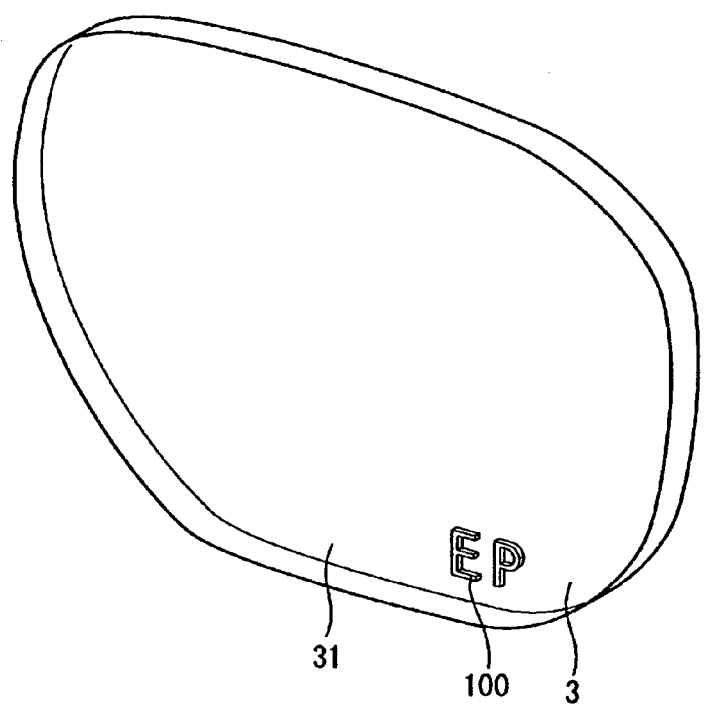
FIG. 2 is a perspective view illustrating a spectacle lens manufactured by the spectacle lens manufacturing system.

FIGS. 1 and 2 show a spectacle lens 3 in which a mark 100 is engraved in the interior thereof. FIG. 1 is a perspective view illustrating spectacles 4 provided with the spectacle lens 3 and a frame 41 into which this spectacle lens 3 is fitted, and FIG. 2 is a perspective view illustrating the spectacle lens 3.

This spectacle lens 3 is an inner surface progressive multifocal lens in which a spherical surface or an aspheric surface is formed on its convex surface 31 (outer surface) and a progressive surface is provided with its concave surface (inner surface). This spectacle lens 3 is a lens made of plastic, for example, polymerized thiourethane. Although not shown in the figures, a hardcoat film for improving abrasion resistance, an anti-reflection film for preventing flicker, ghost, etc., caused by light reflection, and the like are formed on the convex surface 31 and the concave surface of the spectacle lens.

The mark 100 has a three-dimensional structure; for example, the mark may be initials or the like, such as the English letters "EP" used in the examples below. It should be noted that the mark 100 is not limited to English alphabetic characters but may be characters of any type, and designs of any type, such as a star-shaped designed pattern, for example.

2. Configuration of Spectacle Lens Manufacturing System

Figure 3:
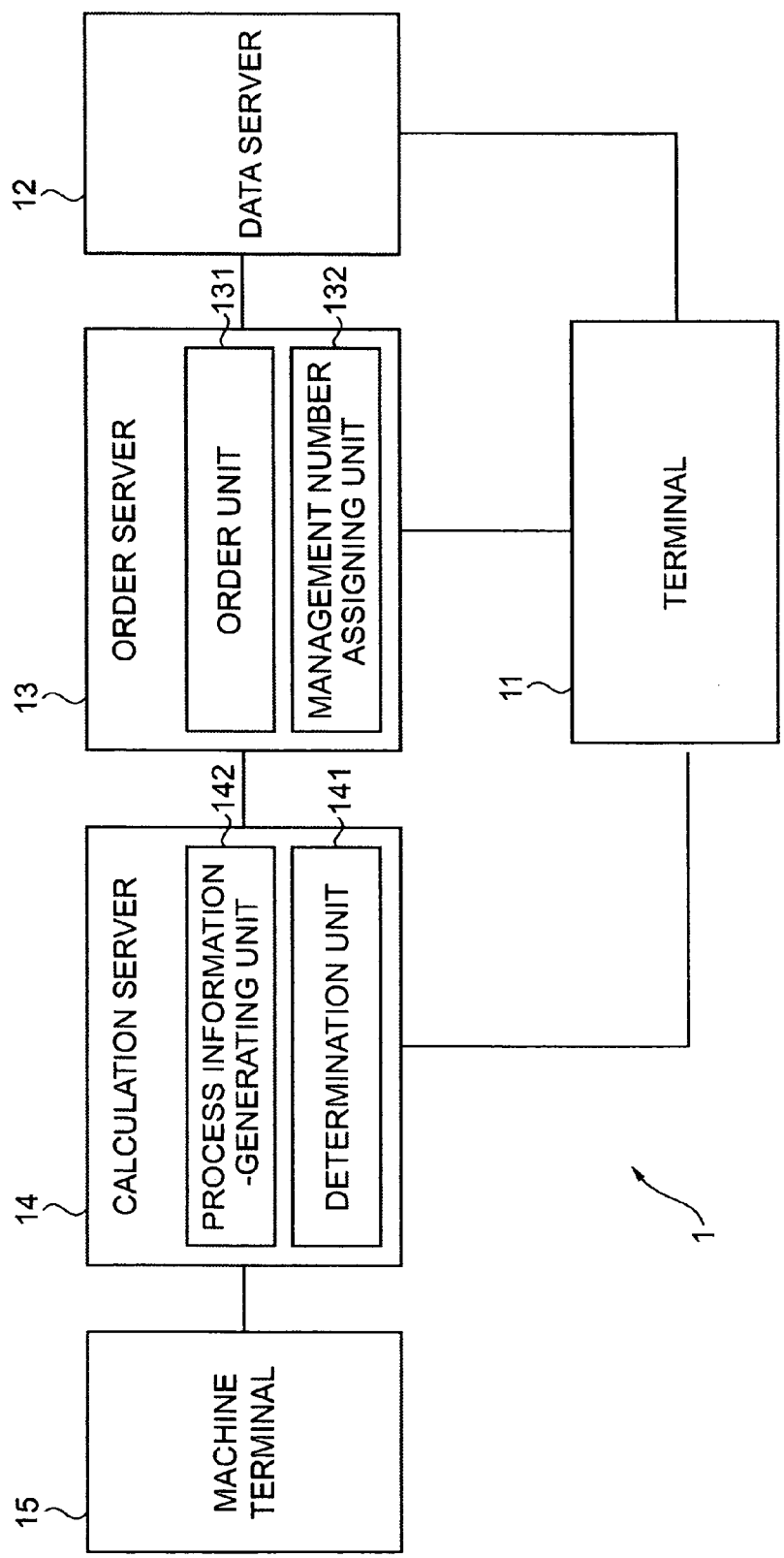
FIG. 3 is a block diagram illustrating the spectacle lens manufacturing system.

Such a spectacle lens 3 is manufactured using a spectacle lens manufacturing system 1 as shown in FIG. 3.

The spectacle lens manufacturing system 1 is provided with a terminal 11 installed in a retail store for the spectacles 4, a data server 12 installed in a factory of the manufacturer of the spectacle lens 3, an order server 13, a calculation server 14, and a machine terminal 15. Here, "retail store" is meant to broadly include a variety of retail situations and settings, even including retail kiosks or any other setting in which a purchaser might purchase such a set of spectacles. Therefore, although "retail store" is used throughout the examples, it will be understood that the term may be understood to include any retail setting.

It will be appreciated that the various units described herein may be implemented as routines or objects executed by a CPU. It will be further appreciated that the units may be thought of in functional terms simply as various means for performing functions. More particularly, it will be understood that: the mark information-acquiring unit may be thought of as means for acquiring mark information, including shape information of a mark to be formed in the interior of the spectacle lens; the lens information-acquiring unit may be thought of as means for acquiring lens information, including outer shape information and optical property information relating to the spectacle lens; the determination unit may be thought of as means for making a possibility determination as to whether the marking of the spectacle lens with the mark is possible, based on the mark information and the lens information; the image generating unit may be thought of as means for generating an image for display on an image display unit, simulating the spectacle lens having the mark, on the basis of the mark information and the lens information, in accordance with the possibility determination; the permission/denial selection unit may be thought of as means for urging a permission/denial selection regarding manufacturing the spectacle lens in accordance with the mark information and the lens information; and the processing information-generating unit may be thought of as means for generating processing information for the spectacle lens, based on the mark information and the lens information, in accordance with the permission/denial selection. Moreover, it will be appreciated that the structure to implement these functions is any kind of computing machinery including, without limitation, general purpose computing equipment, special purpose computing equipment, integrated circuits, and any computing machinery now or hereafter known.

Figure 4:
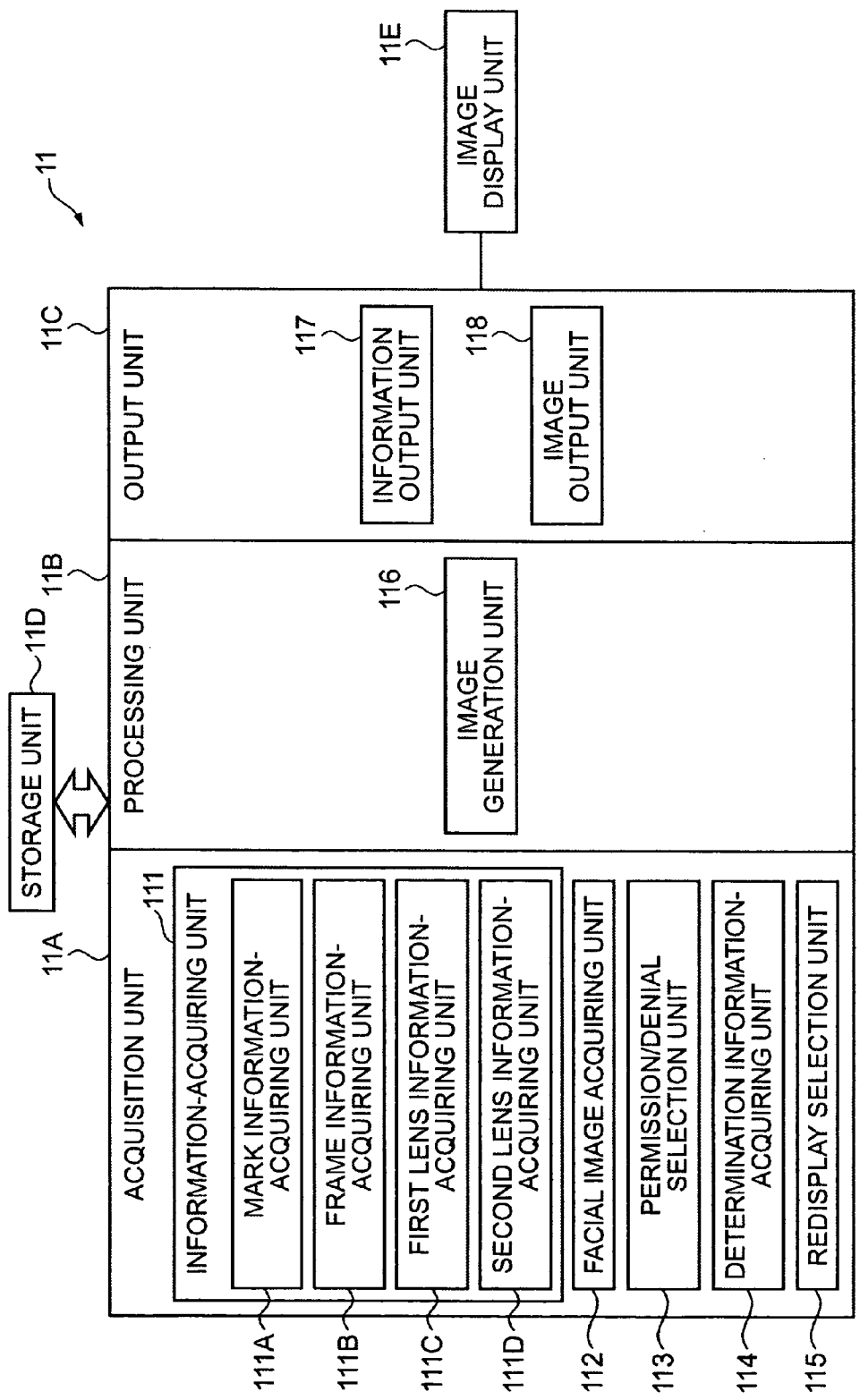
FIG. 4 is a block diagram illustrating a primary portion of the spectacle lens manufacturing system.

The terminal 11 is a general-purpose personal computer or the like provided with a CPU (Central Processing Unit), and it has, as shown in FIG. 4, an acquisition unit 11A that acquires information from the outside the terminal 11 or information stored in a storage unit 11D in the terminal 11, a processing unit 11B that processes the information acquired by the acquisition unit 11A, an output unit 11C, a storage unit 11D for storing the information acquired by the acquisition unit 11A or the like, and an image display unit 11E such as a liquid crystal display.

The acquisition unit 11A includes an information-acquiring unit 111, a facial image-acquiring unit 112, a permission/denial selection unit 113, a determination information-acquiring unit 114, and a redisplay selection unit 115, which are configured as programs deployed on an OS (Operating System) having a multitask function and performing operation control of the CPU.

The information-acquiring unit 111 is for acquiring mark information of a mark to be formed in the interior of the spectacle lens, lens information of the spectacle lens 3, or the like.

The information-acquiring unit 111 includes a mark information-acquiring unit 111A that selects and acquires mark information, a frame information-acquiring unit 111B that selects a frame into which the spectacle lens is to be fitted and acquires frame information, a first lens information-acquiring unit 111C that selects the refractive index (optical property information), the color, the information about the surface treatment of the spectacle lens, and a second lens information-acquiring unit 111D that acquires spectacle prescription (optical property information) of the spectacle lens.

Herein, information about the refractive index (optical property information), color, and surface treatment of the spectacle lens is referred to as first lens information, whereas the spectacle prescription (optical property information) of the lens is referred to as second lens information.

The mark information-acquiring unit 111A is for selecting and acquiring a piece of mark information among a plurality of kinds of mark information for different marks stored in the data server 12.

Here, the mark information includes shape information of a mark (outer shape of a mark, thickness size of the mark, and the like), information about the darkness of the mark, and the like.

It should be noted that the plurality of kinds of mark information for different marks stored in the data server 12 is read out by an image generation unit 116 of the processing unit 11B and a mark image corresponding to each piece of mark information is generated. Then, the mark image is displayed on the image display unit 11E. Thus, the customer can select a mark of his/her choice among a plurality of marks.

The first lens information-acquiring unit 111C is for selecting and acquiring first lens information among a plurality of different pieces of first lens information (the refractive indices of spectacle lenses (optical property information), colors for coloring spectacle lenses, and information about surface treatments), which are stored in the data server 12.

Here, the information about surface treatments refers to such information as the presence or absence of the formation of a hardcoat film in which a hardcoat film for improving abrasion resistance is formed on the spectacle lens, the presence or absence of the formation of an anti-reflection film on the spectacle lens, and the presence or absence of the formation of a watermark-preventing coating film on the spectacle lens.

In addition, the second lens information-acquiring unit 111D is for acquiring a spectacle prescription (optical property information) of a spectacle lens, which is the second lens information. The spectacle prescription of a spectacle lens refers to such things as spherical power, cylindrical power, cylinder axis, addition power, and pupillary distance.

Here, the second lens information-acquiring unit 111D may acquire spectacle prescription through inputting data obtained by eye examination to the terminal 11 with a keyboard or the like, which is not shown in the drawings, or may acquire it by storing spectacle prescriptions of spectacle lenses that were input in the past in the storage unit 11D or the data server 12 of the terminal 11 in advance and reading the data from the storage unit 11D or the data server 12 in the terminal 11.

The frame information-acquiring unit 111B is for selecting and acquiring frame information among a plurality of different pieces of frame information stored in the data server 12.

Here, the information representing the shape of a frame and the frame size, in which distances from the center of the frame are expressed by sets of polar coordinates, and the shape information of the lens edge face, which shows a frame type (full-rim, rimless, four points, etc.) can be cited as examples of the frame information.

By acquiring such frame information, it is possible to obtain the outer shape information of the spectacle lens. That is, the frame information-acquiring unit 111B serves the role as a lens information-acquiring unit for acquiring the outer shape information of a spectacle lens.

Accordingly, lens information, which includes the optical property information of a lens and the outer shape information of a spectacle lens, comprises a portion of the frame information acquired by the frame information-acquiring unit 111B of the information-acquiring unit 111, the first lens information acquired by the first lens information-acquiring unit 111C, and the second lens information acquired by the second lens information-acquiring unit 111D.

Additionally, the plurality of different pieces of frame information stored in the data server 12 is read out by the image generation unit 116 of the processing unit 11B, and a frame image corresponding to each frame information is generated.

Then, the frame image is displayed on the image display unit 11E. Thus, the customer can select a frame of his/her choice among a plurality of frames.

The facial image-acquiring unit 112 is for acquiring a customer's facial image information that is photographed with an imaging means not shown in figure, for example, a digital camera or a video camera, that is connected to the terminal 11.

The facial image information acquired by the facial image-acquiring unit 112, the first lens information acquired by the information-acquiring unit 111, the second lens information, the frame information, and the mark information, as described above, are stored in the storage unit 11D and thereafter read out and combined by the image generation unit 116 of the processing unit 11B, whereby a simulation image is generated.

The simulation image produced by the image generation unit 116 is displayed on the image display unit 11E via an image output unit 118 of the output unit 11C.

Figure 5:
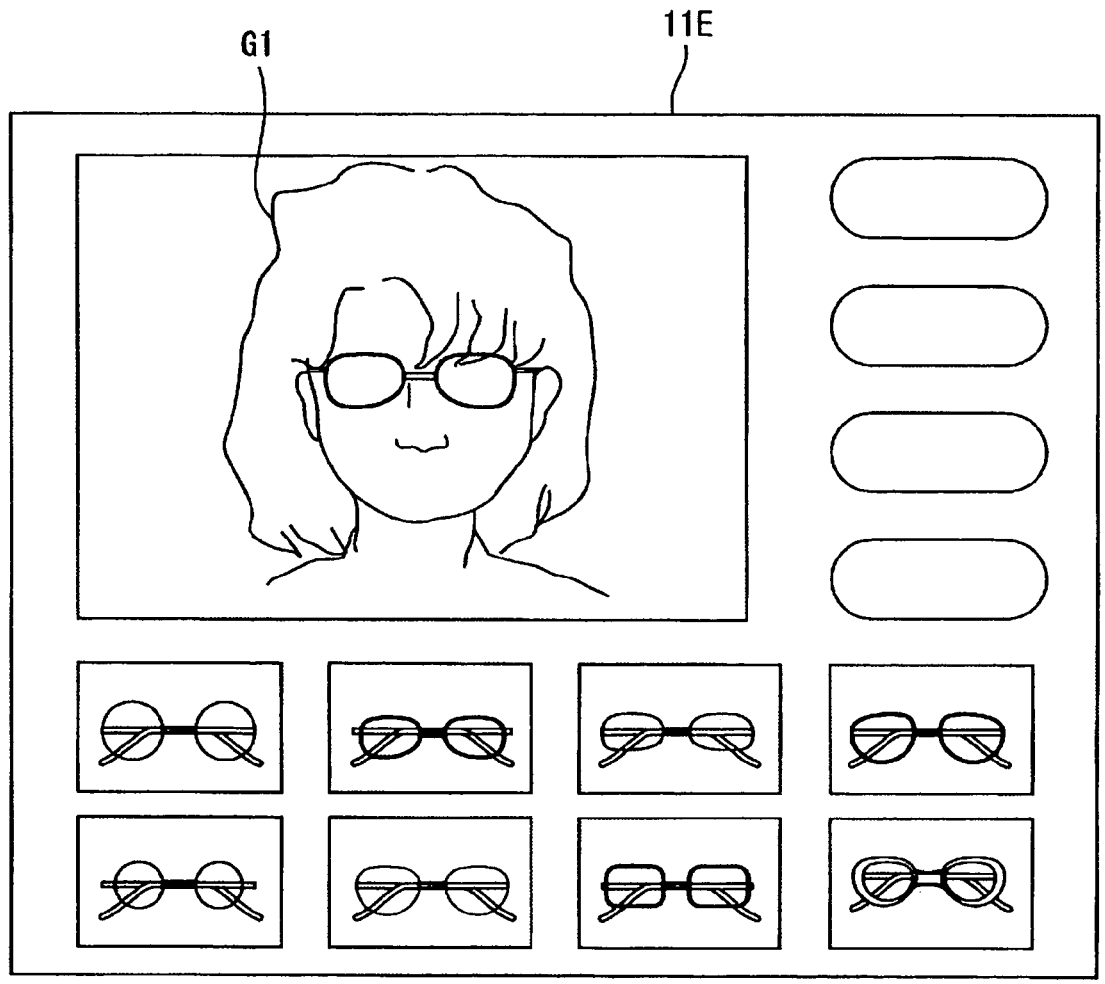
FIG. 5 is a view illustrating a simulation image of spectacles displayed on an image display unit.

For example, the image display unit 11E displays a simulation image G1 as shown in FIG. 5 in which a customer is wearing spectacles lenses. The customer can confirm the outer appearance or the like of the spectacles based on this simulation image G1.

Figure 6:
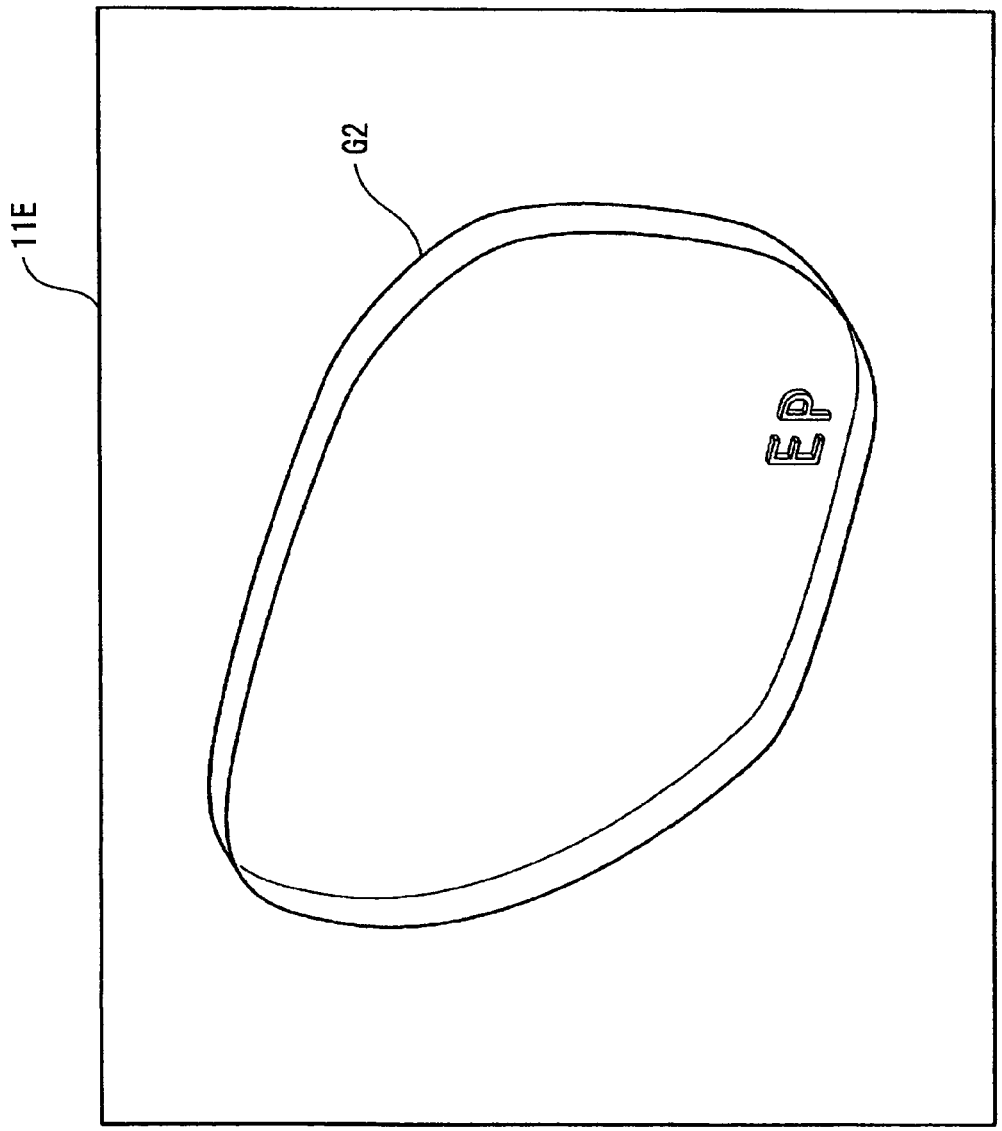
FIG. 6 is a view illustrating a simulation image of a spectacle lens displayed on the image display unit.
Figure 7:
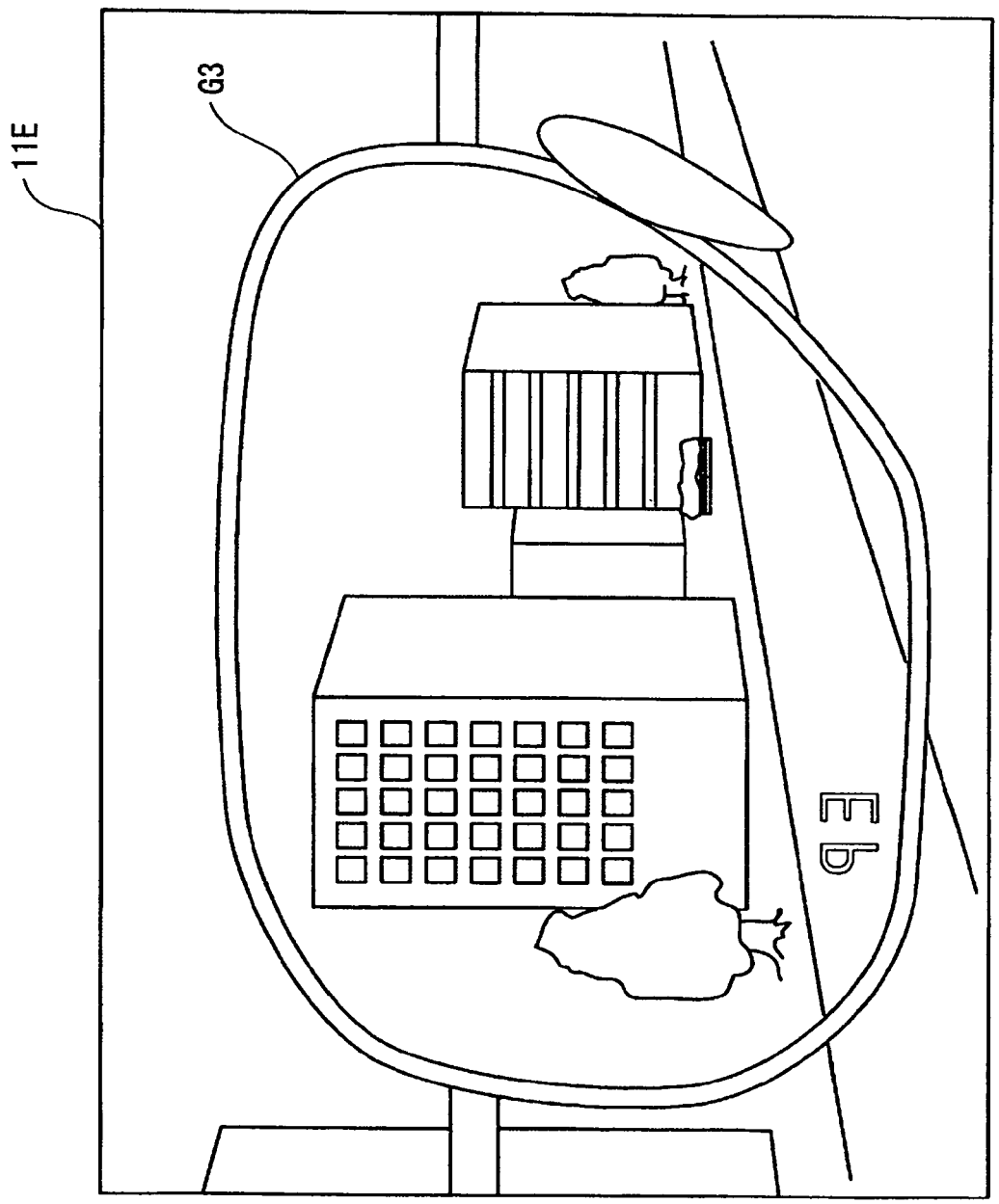
FIG. 7 is a view illustrating a simulation image of a spectacle displayed on the image display unit.

Meanwhile, the image generation unit 116 can also form a three-dimensional image of a spectacle lens in which a mark is formed in the interior thereof based on the first lens information, the second lens information, the frame information, and the mark information. Furthermore, it is possible to form a simulation of a view that is viewed through a spectacle lens. Such images are displayed on the image display unit 11E via the image output unit 118, resulting in simulation images G2 and G3 shown in FIGS. 6 and 7, respectively.

As a result of this, the customer can confirm the thickness size of a spectacle lens and a view that is viewed through a spectacle lens based on the simulation images G2 and G3.

The redisplay selection unit 115 is for urging the user to select whether or not it is required to change the spectacles that have been displayed on the image display unit 11E and redisplay its simulation image, and for acquiring information about whether or not redisplay is to be performed.

If the redisplay selection unit 115 has acquired the information acknowledging that redisplay is to be performed, the information-acquiring unit 111 acquires again the mark information, the first lens information of the spectacle lens, the frame information, and the like. Then, based on the information that has been acquired again, the image generation unit 116 generates a new simulation image, which is displayed on the image display unit 11E.

If the redisplay selection unit 115 acquires the information acknowledging that redisplay is not performed, the information output unit 117 of the output unit 11C outputs the mark information, the first lens information, the second lens information, and the frame information that form the simulation image displayed on the image display unit 11E to the calculation server 14 (see FIG. 3).

In the calculation server 14, a determination unit 141 determines whether or not a mark can be marked in the interior of a spectacle lens based on the mark information, the first lens information, the second lens information, and the frame information. This determination may be referred to as a possibility determination.

The determination information-acquiring unit 114 is for acquiring the determination result obtained by the determination unit 141 of the calculation server 14.

The permission/denial selection unit 113 is for urging the user to select permission or denial for manufacturing the spectacle lens and acquiring the information acknowledging the permission or denial when the determination information-acquiring unit 114 receives the determination result to the effect that marking is possible.

If this permission/denial selection unit 113 acquires the information acknowledging the permission for manufacturing a spectacle lens, the information output unit 117 of the output unit 11C outputs the first lens information, the second lens information, the frame information, and the mark information of a spectacle lens to the order server 13.

The data server 12 shown in FIG. 3 is provided with a hardware configuration necessary for a general server, which includes a CPU (Central Processing Unit), a main storage device, an input/output device, a communication control device, an external storage device, and the like, although not shown in the figure. It serves the role of a storage unit that stores a plurality of kinds of mark information for different marks, a plurality of kinds of frame information for different frames, first lens information of spectacle lenses, and the like. The data server 12 and the terminal 11 are connected to each other by a communication line, such as the Internet or a private line. The communication line could also be any kind of line adapted to carry communications between a client terminal and a server. It should be noted that the frame information and the like stored in this data server 12 are updateable, and a control program that is necessary for updating is stored therein.

Although the data server 12 is installed in the present embodiment, the embodiment is not limited thereto; it is also possible to store the data within the data server 12 into the storage unit 11D of the terminal 11 that is installed in the retail store. Alternatively, the data may be stored in both the data server 12 and the storage unit 11D of the terminal 11.

The order server 13 is also provided with a hardware configuration necessary for a general server, which includes a CPU (Central Processing Unit), a main storage device, an input/output device, a communication control device, an external storage device, and the like, although not shown in the figure. It acquires and stores the first lens information, the second lens information, the frame information, and the mark information of the spectacle lens whose permission for manufacturing has been acquired by the permission/denial selection unit 113 as order information, using the order unit 131. Then, this order information is transferred to the calculation server 14. The order server 13 and the terminal 11 are connected by a communication line, for example, by the Internet or a private line, and the calculation server 14 and the order server 13 are connected by, for example, a LAN.

Additionally, the order server 13 is provided with a management number assigning unit 132 for assigning different management numbers to respective order information.

The calculation server 14 is also provided with a hardware configuration necessary for a general server, which includes a CPU (Central Processing Unit), a main storage device, an input/output device, a communication control device, an external storage device, and the like, although not shown in the figure. It includes a determination unit 141 as a program deployed on an OS (operating System) that performs the operation control of the server 14 as a whole, and a processing information-generating unit 142.

The determination unit 141 is for receiving the mark information, the first lens information, the second lens information, and the frame information that have been output from the information output unit 117 of the terminal 11, and determining whether or not a mark can be marked into the interior of the spectacle lens based on the received information.

More specifically, the determination unit 141 calculates the area of the portion in which marking is possible from the lens information including the outer shape information of the spectacle lens corresponding to the frame shape, the refractive index of the spectacle lens, the spectacle prescription of the spectacle lens, and the like, and further obtains a thickness size of that portion in which marking is possible.

Then, the determination unit 141 checks the results with the mark information, and determines whether marking is possible or not within the region of the portion in which marking is possible; for example, whether or not the mark fits within the thickness size of the spectacle lens, whether or not the mark fits within the area in which marking is possible, and so forth.

The determination result by such a determination unit 141 is output to the determination information-acquiring unit 114 of the terminal 11. The calculation server 14 and the terminal 11 are connected by, for example, the Internet or a private line.

Figure 8A:
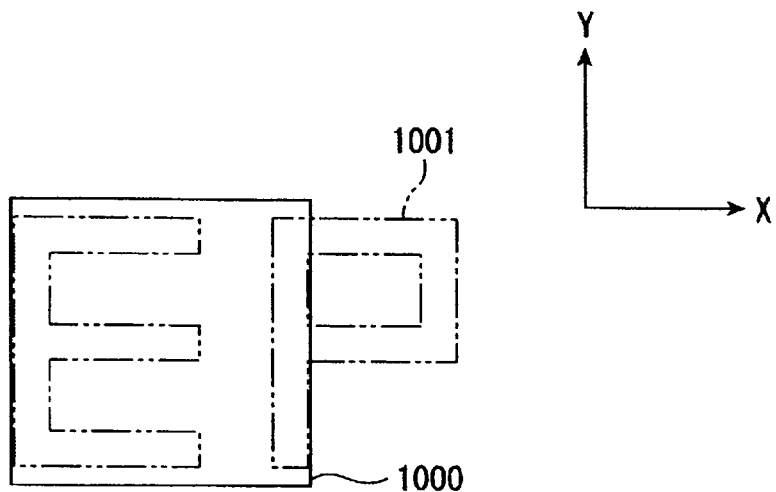
FIG. 8 is a schematic diagram illustrating the content in which marks are made smaller or the marks are modified when a determination unit determines that marking is impossible.
Figure 8B:
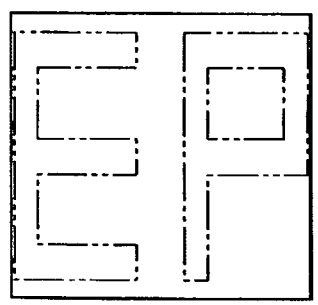
Figure 8C:
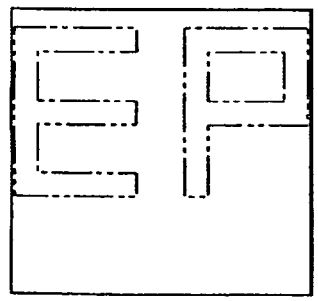

It should be noted that the information necessary for marking, such as mark information, needs to be acquired once again by the information-acquiring unit 111 when the determination unit 141 determines that marking is impossible, and at this time, the determination unit 141 may output the information for permitting the marking. For example, when the range of the x-axis orientation of a mark 1001 does not fit a region 1000 in which marking is possible, as shown in FIG. 8A, the length along the x-axis orientation is reduced so as to fit within the region 1000, as shown in FIG. 8B, or the entire size of the mark is reduced and corrected so as to fit within the region 1000, as shown in FIG. 8C. The correction data at this time can be output by the determination unit 141 to be reflected on the data in the mark information-acquiring unit 111A of the information-acquiring unit 111. The correction with respect to the thickness orientation can be made in a similar manner.

It should be noted that the data to be corrected and output are not limited to the mark information but may be the frame information as well as the first lens information and the second lens information.

The processing information-generating unit 142 generates processing information for a spectacle lens based on the order information received by the order server 13, including the first lens information, the second lens information, the frame information, and the mark information.

The processing information includes drive information of a grinding apparatus necessary for grinding an unprocessed (semifinished), circular spectacle lens to meet the spectacle prescription of the spectacle lens, drive information of an NC machine tool for edging an unprocessed circular spectacle lens to shape it into a frame shape, and drive information of a marking apparatus for carrying out marking.

Here, the drive information of a marking apparatus includes such data as the shift amount of the stage and the shift direction of the stage when a stage for holding the spectacle lens in the marking apparatus is shifted relative to a laser beam output unit, the strength of the laser beam, and timing for opening/closing the shutter for blocking the laser beam.

The processing information generated by such a processing information-generating unit 142 is sent to the machine terminal 15 connected by, for example, LAN.

The machine terminal 15 is connected to a grinding apparatus for grinding spectacle lenses to give them desired dioptric powers, an NC machine tool for carrying out edging, a marking apparatus, and the like, and it outputs instructions corresponding to the processing information to respective apparatus and machines.

3. Method of Manufacturing Spectacle Lenses

Figure 9:
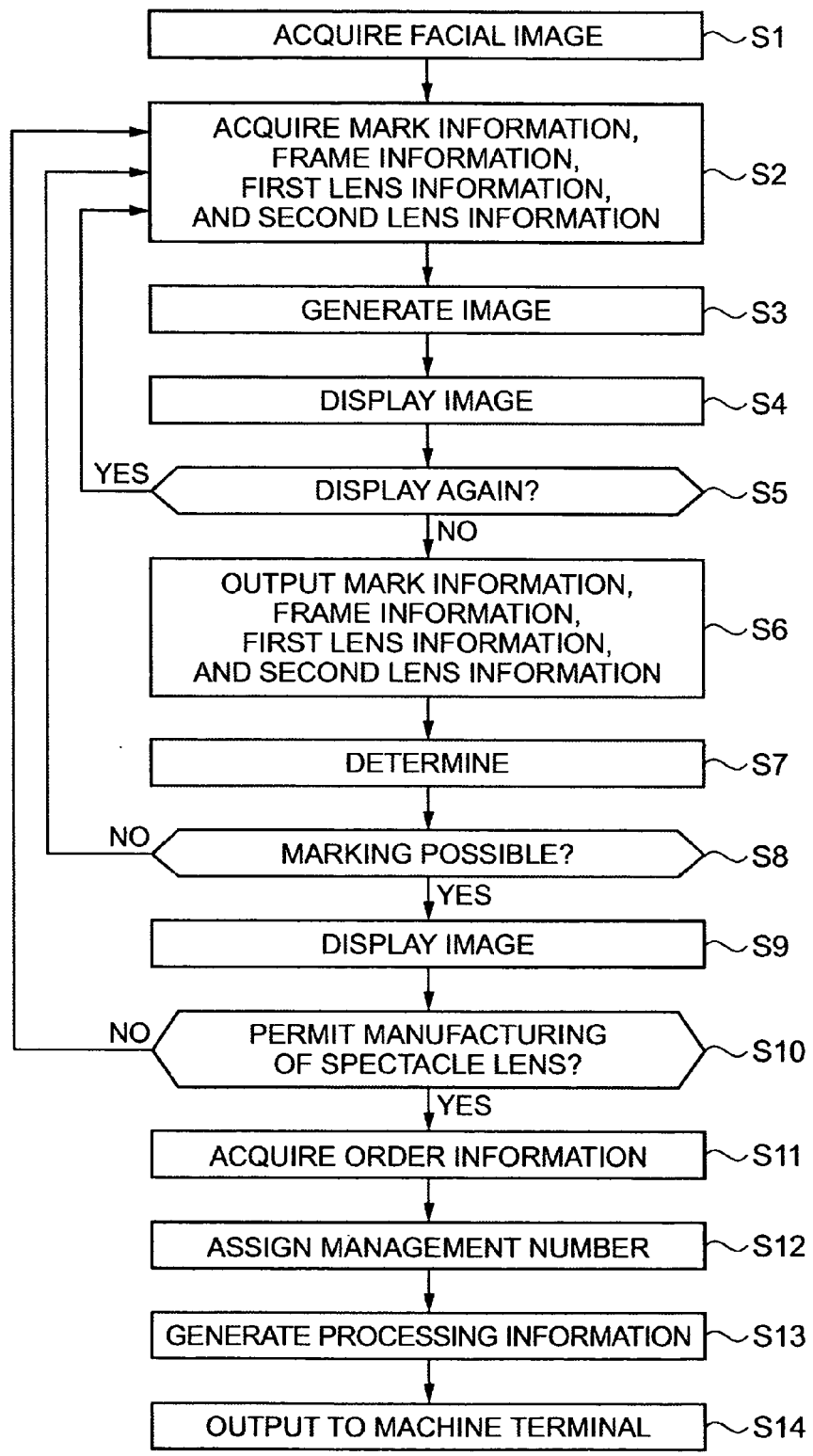
FIG. 9 is a flowchart illustrating a method of manufacturing a spectacle lens.

A method of manufacturing a spectacle lens 3 that uses the spectacle lens manufacturing system 1 as described above is discussed below with reference to FIGS. 1 and 9. FIG. 9 shows a flowchart illustrating a method of manufacturing a spectacle lens 3.

First, a facial image of a customer is acquired by the facial image-acquiring unit 112 of the terminal 11 installed in a retail store (process S1).

Next, the mark information of a mark 100 and the lens information of a spectacle lens 3 are acquired by the information-acquiring unit 111 (information acquiring procedure, process S2).

Specifically, the mark information of the mark 100 is selected and acquired by the mark information-acquiring unit 111A among a plurality of pieces of mark information stored in the data server 12. In addition, the frame information of the frame 41 is selected and acquired by the frame information-acquiring unit 111E among a plurality of pieces of frame information stored in the data server 12. Furthermore, the first lens information (the refractive index of spectacle lens, color, information about surface treatment) related to the spectacle lens 3 is selected and acquired by the first lens information-acquiring unit 111C among a plurality of pieces of first lens information stored in the data server 12. Further, the spectacle prescription, which is the second lens information, of the spectacle lens 3 is acquired by the second lens information-acquiring unit 111D.

Then, these pieces of the acquired information and the facial image information acquired by the facial image-acquiring unit 112 are combined by the image generation unit 116 to generate a simulation image (process S3, image generation procedure).

Then, this simulation image is displayed on the image display unit 11E (process S4, image display procedure).

The image generation unit 116 generates not only a simulation image G1 in which spectacles and a facial image are combined (see FIG. 5) but also a three-dimensional image G2 of a spectacle lens (see FIG. 6) as well as simulation image G3 of a view that is viewed through a spectacle lens (see FIG. 7), and the image display unit 11E displays these simulation images G1 to G3.

Next, it is judged whether or not redisplay is selected in the redisplay selection unit 115 (process S5).

If redisplay is selected in the redisplay selection unit 115, that is, if the customer requires to change the spectacles displayed on the image display unit 11E, the mark information, the first lens information, and the frame information are acquired again by the information-acquiring unit 111 (process S2), and the image generation (process S3) and the image display (process S4) are repeated.

If redisplay is not selected in the redisplay selection unit 115, the mark information, the first lens information, the second lens information, and the frame information of the spectacle lens that has been displayed on the image display unit 11E are output from the information output unit 117 of the terminal 11 to the calculation server 14 (process S6).

It should be noted that when redisplay is not selected, the simulation images G1 to G3 generated by the image generation unit 116 are stored in the storage unit 11D within the terminal 11.

Next, in the determination unit 141 of the calculation server 14, it is determined whether marking is possible or not based on the first lens information, the second lens information, the frame information, and the mark information (determination procedure, process S7).

Then, the result of this determination is acquired by the determination information-acquiring unit 114 of the terminal 11.

If the determination information-acquiring unit 114 acquires the determination result to the effect that marking is possible (process S8), the simulation images are displayed again on the image display unit 11E (image display procedure, process S9).

Here, since the image of the spectacle lens to which marking is determined to be possible by the determination information-acquiring unit 114 has already been generated in the foregoing image generation procedure and stored in the storage unit 11D, only the display of the image is carried out here.

It should be noted that the simulation image of the spectacle lens to which marking is determined to be possible by the determination information-acquiring unit 114 may be generated again.

The customer confirms the simulation image displayed on the image display unit 11E, and it is judged whether or not this spectacle lens 3 should be manufactured.

On the other hand, if the determination information-acquiring unit 114 acquires the determination result to the effect that marking is impossible (process S8), the information-acquiring unit 111 again acquires the mark information, the first lens information, and the frame information (process S2).

It should be noted that, as previously described, when, for example, correction data for a mark can be output from the determination unit 141 in the case where a mark 1001 does not fit in a region 1000 in which marking is possible and marking is determined to be impossible (see FIG. 8), the information-acquiring unit ill acquires the correction data and the image generation unit 116 generates a simulation image in which the correction data is reflected. Then, the image display unit 11E displays this generated simulation image.

Next, either permission or denial for manufacturing the spectacle lens 3 that has obtained the judgment result to the effect that marking is possible is selected by the permission/denial selection unit 113, and the information acknowledging either permission or denial for manufacturing the spectacle lens 3 is acquired (permission/denial selection procedure, process S10).

If permission for manufacturing the spectacle lens 3 is selected in the permission/denial selection unit 113, the mark information, the first lens information, the second lens information, and the frame information are transferred from the information output unit 117 of the terminal it to the order server 13.

If manufacturing of the spectacle lens 3 is denied in the permission/denial selection unit 113, the information-acquiring unit 111 acquires the mark information, the frame information, and the like once again (process S2).

The order unit 131 of the order server 13 acquires, as order information, the mark information, the first lens information, the second lens information, and the frame information (process S11), and a management number are assigned in the management number assigning unit 132 (process S12).

Then, this order information is sent to the processing information-generating unit 142 of the calculation server 14, and based on the order information, processing information of the spectacle lens is generated by the processing information-generating unit 142 (processing information-generating procedure, process S13).

Further, this processing information is output to the machine terminal 15 (process S14), instructions are given to the apparatus and the like that are connected to the machine terminal 15.

Figure 10:
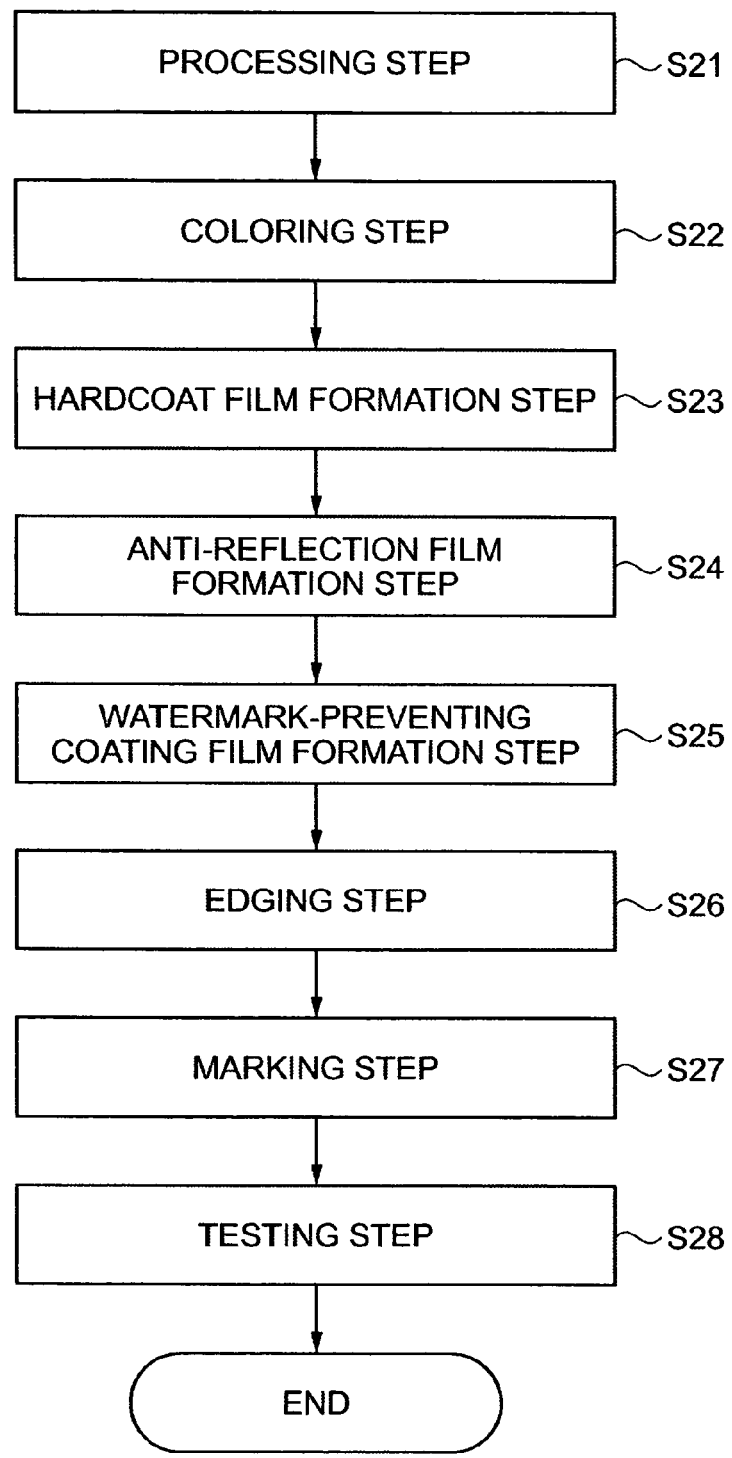
FIG. 10 is a flowchart illustrating a processing procedure of a spectacle lens.

The apparatus and the like connected to the machine terminal 15 carry out processing of the spectacle lens 3, for example, in the order shown in FIG. 10. FIG. 10 is a flowchart illustrating a processing procedure of the spectacle lens 3.

First, a processing step of cutting and grinding a circular spectacle lens (semifinished lens) so as to process it according to a spectacle prescription is carried out (process S21). Next, based on the information acquired by the first lens information-acquiring unit 111C of the terminal 11, the following processing steps are carried out; a color processing step of coloring the spectacle lens 3 (process S22), a hardcoat film formation step of forming a hardcoat film for improving abrasion resistance on the spectacle lens 3 (process S23), an anti-reflection film formation processing step (process S24) of forming an anti-reflection film for preventing flicker, ghost, or the like caused by light reflection, or the like, and a watermark-preventing coating film formation processing step (process S25). It should be noted that not all the above processing steps need to be performed.

Then, an edging step of processing the spectacle lens 3 into the shape of the spectacle frame 41 is performed (process S26).

Next, a marking step of engraving a mark in the interior of the spectacle lens 3 with a laser beam is performed (process S27).

In the marking step, using a mode-locked titanium sapphire laser, marking is carried out by a so-called femtosecond laser beam having a wavelength of 800 nm, a maximum output of 1 W, a pulse width of 100 fs, and a repetition rate of 1 kHz.

Thus, it is possible to obtain a spectacle lens 3 in which the mark 100 is formed.

Next, the spectacle lens 3 manufactured in the above-described manner is subjected to an inspection (inspection step, process S28).

In the inspection step, the spectacle lens 3 is checked against a processing instruction document based on the order information received by the order server 13, and thereby the spectacle lens 3 is inspected.

Additionally, the inspection of the mark 100 of the spectacle lens 3 is performed by forming a simulation image in the factory based on the order information and comparing the mark 100 with the simulation image.

For example, a test is carried out as to whether or not the mark 100 in the spectacle lens 3 matches the way in which the mark in the simulation image is viewed when the mark is viewed from a predetermined angle.

If the spectacle lens 3 is determined as good in such an inspection step, the spectacle lens 3 is shipped to the retail store.

Many advantages are exhibited by the present embodiment.

The spectacle lens manufacturing system 1 has the determination unit 141 for determining whether marking is possible or not based on the mark information and the lens information of a spectacle lens; therefore, it is possible in a retail store to judge whether the marking or the like required by a customer is possible.

In the case where, for example, it is judged by the determination unit 141 that the mark does not fit in the interior of the spectacle lens and that the marking is impossible, the mark can be reduced or the mark can be changed; thereby, it is possible to deal with a variety of markings required by persons.

The spectacle lens manufacturing system 1 of this embodiment has the image generation unit 116 for forming a simulation image of a spectacle lens, the image display unit 11E for displaying the simulation image, and moreover, the permission/denial selection unit 113 for urging selection of permission or denial for manufacturing the spectacle lens displayed on the image display unit 11E. Therefore, based on the simulation image, the customer can check the outer appearance of the spectacle lens and that the mark does not obstruct the range of vision, and it is possible to judge whether or not the spectacle lens should be manufactured.

Thus, it is possible to manufacture spectacle lenses that meet demands from customers, and, in addition, it is possible to avoid the manufacture of spectacle lenses that do not meet demands from customers.

In particular, the image generation unit 116 generates not only the simulation image G1 in which the spectacles and a facial image are combined but also the simulation image G3 of a view that is viewed through the spectacle lens, and the image display unit 11E displays these images; as a result of this, the customer can visualize the characteristics of the spectacle lens without the actual manufacture thereof.

Moreover, the customer can purchase spectacle lenses based on the simulation images in the retail store and, therefore, it is unnecessary to maintain in the retail store a large number of lens samples. This achieves space-saving in retail stores.

With one embodiment, the calculation server 14 installed in a factory has the determination unit 141 for determining whether or not marking of a mark into the interior of a spectacle lens is possible, and the processing information-generating unit 142 for generating processing information of a spectacle lens; therefore, the capacity of the terminal 11 can be reduced in comparison to the case in which these elements are provided in the terminal installed in a retail store.

In the spectacle lens manufacturing system 1 of this embodiment, the mark to be formed in a spectacle lens is determined by selecting mark information among a plurality of kinds of mark information for different marks stored in the data server 12, and therefore, it is unnecessary to generate mark information of the mark to be formed in the spectacle lens. This makes it possible to save the trouble of generating mark information and to simplify the manufacture of spectacle lenses.

In the inspection step for manufactured spectacle lens 3, the spectacle lens 3 is checked against a processing instruction document based on the order information received by the order server 113 to examine the spectacle lens 3. Thus, it is possible to prevent defective products from being shipped.

Furthermore, the inspection for the mark 100 is performed by comparing the mark 100 with the simulation images, and thereby, it is possible to check spectacle lenses with marks that are not formed into desired shapes.

The spectacle lens 3 manufactured by the spectacle lens manufacturing system 1 of this embodiment becomes a lens in which the mark 100 of initials or the like is engraved in the interior thereof, and thus, it is possible to differentiate it from other spectacle lenses.

5. Some Possible Modifications

It should be noted that the invention is not limited to the foregoing embodiment, and modifications and improvements of the invention, as long as they accomplish the objects of the invention, are encompassed within the scope of the invention.

For example, in the foregoing embodiment, a plurality of kinds of mark information are accumulated in the data server 12 and a mark is selected by selecting mark information from the data server 12; but this is not always necessary. For example, it is possible to provide a mark information-generating unit in a terminal 11 of a retail store so that mark information may be generated by this mark information-generating unit and the generated mark information may be acquired.

For example, it is also possible to capture photolithographs, logo marks, and the like that customers bring in by a scanner or the like, and to generate, mark information based on these. In addition, it is possible to convert two-dimensional marks that customers bring in into three-dimensional mark information with the mark information-generating unit so that this three-dimensional mark information may be acquired and the three-dimensional mark may be given to a spectacle lens.

Moreover, a software for generating mark information may be incorporated within the terminal 11 so that mark information may be generated by the terminal 11.

By doing so, it becomes possible to meet demands from customers more adequately.

Furthermore, in the foregoing embodiment, the determination unit 141 for determining whether marking is possible or not based on the mark information and the lens information of the spectacle lens is provided in the calculation server 14 installed in a factory of the manufacturer, but the determination unit 141 may be incorporated in the terminal 11 of the retail store. By doing so, it is possible to determine whether marking is possible or not within the retail store.

In addition, the generation of processing information may also be performed by the terminal of the retail store, not by the calculation server. By doing so, the calculation server becomes unnecessary.

In the foregoing embodiment, the mark 100 of the spectacle lens 3 was alphanumerical characters such as initials; however, this is not always necessary, and it is possible to use alphanumerical characters representing product names, manufacturers, brand names, and serial numbers.

For example, in cases where the mark is product name, manufacturer, brand name, and serial number, whether or not the mark can be given in the interior of the spectacle lens is checked with a customer. If the customer approves of giving the mark, the information-acquiring unit ill acquires the mark information for product name, manufacturer, brand name, serial number, and the like. The manufacture steps that follow are similar to those in the foregoing embodiment.

Moreover, in the foregoing embodiment, the frame information-acquiring unit 111B of the information-acquiring unit 111 of the terminal 11 selects the frame information accumulated in the data server 12, but this is not always necessary. For example, when desired frame information is not accumulated in the data server 12, an image may be taken in the state in which the customer is wearing spectacles displayed in the retail store, and frame information may be acquired together with the facial image.

Furthermore, the invention can be realized not only by the spectacle lens manufacturing system 1 as shown in the foregoing embodiment but also by a program for executing the method of manufacturing a spectacle lens with a computer, as well as a computer-readable recording medium in which this program is recorded, such as a CD-ROM and a memory card.

There is claimed:

1. A spectacle lens manufacturing system, for manufacturing a spectacle lens in which a mark is formed, comprising:
    a mark information-acquiring unit adapted to acquire mark information, including shape information of a mark to be formed in the interior of the spectacle lens;
    a lens information-acquiring unit adapted to acquire lens information, including outer shape information and optical property information relating to the spectacle lens;
    a determination unit adapted to make a possibility determination as to whether the marking of the spectacle lens with the mark is possible, based on the mark information and the lens information;
    an image generation unit adapted to generate an image simulating the spectacle lens, having the mark, on the basis of the mark information and the lens information, in accordance with the possibility determination, for display on an image display unit;
    a permission/denial selection unit adapted to urge a permission/denial selection regarding manufacturing the spectacle lens in accordance with the mark information and the lens information;
    a processing information-generating unit adapted to generate processing information for the spectacle lens based on the mark information and the lens information in accordance with the permission/denial selection;
    a storage unit storing mark information for a plurality of marks, wherein the mark information-acquiring unit acquires the mark information from the storage unit; and
    a mark information-generating unit adapted to generate the mark information, wherein the mark information acquired by the information-acquiring unit comprises the mark information generated by the mark information-generating unit.

2. The spectacle lens manufacturing system according to claim 1, further comprising:
    a terminal, adapted for installation in a retail store, and intended to facilitate selling the spectacle lens; and
    a server capable of communicating data with the terminal; wherein:
        the terminal includes one or more of the mark information-acquiring unit, the lens information-acquiring unit, the image generation unit, and the permission/denial selection unit; and
        the server includes one or more of the determination unit and the processing information-generating unit.

3. The spectacle lens manufacturing system according to claim 1, wherein the mark to be formed in the interior of the spectacle lens is a visible, representative sign or symbol engraved in the interior of the spectacle lens.

4. The spectacle lens manufacturing system according to claim 1, wherein the mark to be formed in the interior of the spectacle lens comprises a pattern to be engraved into the spectacle lens.

5. The spectacle lens manufacturing system according to claim 1, wherein the mark information-acquiring unit is adapted to acquire the mark information from a user selecting from at least two marks selected from the storage unit and the mark information-generation unit.

6. The spectacle lens manufacturing system according to claim 1, further comprising a frame information acquiring unit adapted to acquire frame information comprising shape information of the frame into which the spectacle lens is to be fitted, and wherein the determination unit is adapted to make the possibility determination based on the mark information, the lens information, and the frame information.

7. The spectacle lens manufacturing system according to claim 1, wherein the determination unit is adapted to determine whether the mark to be formed on the interior of the spectacle lens will obstruct a vision of view of the spectacle lens.

8. The spectacle lens manufacturing system according to claim 1, wherein, when the determination unit determines that the spectacle lens with the mark is possible, the permission/denial selection unit is adapted to request from a user a permission/denial selection regarding the manufacturing of the spectacle lens.

9. The spectacle lens manufacturing system according to claim 1, the image generation unit adapted to generate an image depicting the spectacle lens with the mark and a field of view that will be observed through the spectacle lens with the mark.

10. A spectacle lens manufacturing method, for manufacturing a spectacle lens in which a mark is formed, comprising:
  acquiring mark information, including shape information of a mark to be formed in the interior of the spectacle lens;
  acquiring lens information, including outer shape information and optical property information relating to the spectacle lens;
  making a possibility determination as to whether the marking of the spectacle lens with the mark is possible, based on the mark information and the lens information;
  generating an image for display on an image display unit, simulating the spectacle lens having the mark, on the basis of the mark information and the lens information, in accordance with the possibility determination;
  urging a permission/denial selection regarding manufacturing the spectacle lens in accordance with the mark information and the lens information; and
  generating processing information for the spectacle lens, based on the mark information and the lens information, in accordance with the permission/denial selection,
  on a terminal in a retail setting, performing one or more of the acquiring of the mark information, the acquiring of the lens information, the generating of the image, and the obtaining of the permission/denial selection;
  on a server in communication with the terminal, performing one or more of the making of the possibility determination and the generating of the processing information;
  storing the mark information for a plurality of marks, wherein the acquired mark information comprises the stored mark information of the plurality of marks; and
  generating the mark information, wherein the acquired mark information further comprises the generated mark information.

11. The spectacle lens manufacturing method according to claim 10, wherein said generating the mark information is in response to a mark selection indication; and the acquiring of the mark information comprises acquiring, as the mark information, the information generated in response to the mark selection indication.

12. A computer program product, for enabling a computer system to perform operations implementing a spectacle lens manufacturing method, comprising:
  a computer readable medium, and
  computer instructions on the computer readable medium;
    wherein the operations comprise:
      acquiring mark information, including shape information of a mark to be formed in the interior of the spectacle lens;
      acquiring lens information, including outer shape information and optical property information relating to the spectacle lens;
      making a possibility determination as to whether the marking of the spectacle lens with the mark is possible, based on the mark information and the lens information;
      generating an image for display on an image display unit, simulating the spectacle lens having the mark, on the basis of the mark information and the lens information, in accordance with the possibility determination;
      urging a permission/denial selection regarding manufacturing the spectacle lens in accordance with the mark information and the lens information;
      generating processing information for the spectacle lens, based on the mark information and the lens information, in accordance with the permission/denial selection,
      storing the mark information for a plurality of marks, wherein said acquired mark information comprises the stored mark information for the plurality of marks; and
      generating the mark information, wherein said acquired mark information further comprises the generated mark information.

13. The computer program product according to claim 12, wherein said generating the mark information is in response to a mark selection indication; and the acquiring of the mark information comprises acquiring, as the mark information, the information generated in response to the mark selection indication.

14. A spectacle lens manufacturing system, for manufacturing a spectacle lens in which a mark is formed, comprising:
  mark information-acquiring means for acquiring mark information, including shape information of a mark to be formed in the interior of the spectacle lens;
  lens information-acquiring means for acquiring lens information, including outer shape information and optical property information relating to the spectacle lens;
  determination means for making a possibility determination as to whether the marking of the spectacle lens with the mark is possible, based on the mark information and the lens information;
  image generating means for generating an image for display on an image display unit, simulating the spectacle lens having the mark, on the basis of the mark information and the lens information, in accordance with the possibility determination;

permission/denial selection means for urging a permission/denial selection regarding manufacturing the spectacle lens in accordance with the mark information and the lens information;

processing information-generating means for generating processing information for the spectacle lens, based on the mark information and the lens information, in accordance with the permission/denial selection;

storage means for storing the mark information for a plurality of marks, wherein the mark information-acquiring means acquires the mark information from the storage means; and a mark information-generating means for generating the mark information, wherein the mark information acquired by the information-acquiring means comprises the mark information generated by the mark information-generating means.

15. The spectacle lens manufacturing system according to claim 14, wherein the mark information-generating means generates the mark information in response to a mark selection indication; and the mark information-acquiring means performs the acquiring of the mark information by acquiring, as the mark information, the information generated in response to the mark selection indication.

* * * * *